Patented Aug. 31, 1948

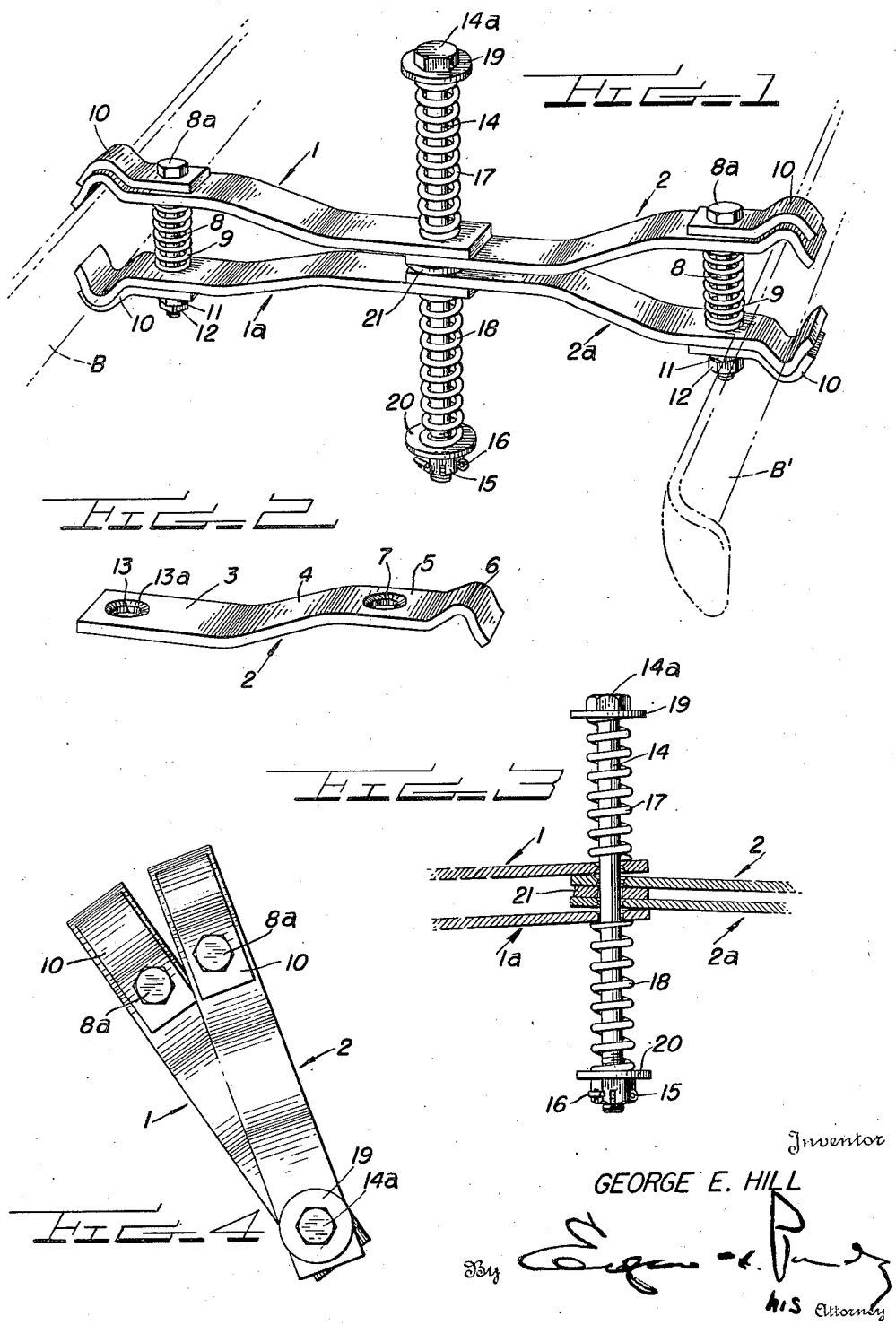

2,448,311

UNITED STATES PATENT OFFICE 2,448,311

TOW BAR

George E. Hill, Washington Suburbs, Prince Georges County, Md.

Application March 8, 1946, Serial No. 652,901

5 Claims. (Cl. 280—33.14)

This invention relates to tow bars for vehicles, such for example as automobiles, capable of being connected between rear bumper of the towing or pilot vehicle and the front bumper of the towed or trailing vehicle.

An important object of my invention is to provide a tow bar which may be quickly and conveniently connected between the bumpers of the pilot and trailing vehicles and which is so constructed and arranged as to insure that the trailing vehicle will truly track behind the pilot vehicle, on straightaways as well as on curves, without swinging over into the lane of oppositely moving traffic, such as is frequently the cause of accidents on highways.

Another object of my invention is to provide a tow bar of strong and rugged construction and which is so flexibly constructed as to substantially reduce the transmission of vibrations, jolts and shocks, incident to travel over rough or bumpy roads, from one vehicle to another and without danger of the accidental disconnection of the tow bar while in service.

Still another object of my invention is to provide a tow bar of the above character which is of comparatively simple construction and comprising relatively few parts and which is capable of rapid and economical manufacture.

A further object of my invention is to provide a tow bar of the above character which is capable of being collapsed into compact condition without necessitating its disassembly so as to allow the tow bar to be conveniently stowed away within a comparatively small space in the luggage compartment or tool box of an automobile.

Other objects and advantages will be apparent from the following detailed description of a preferred embodiment of the invention, reference being had to the annexed drawing in which:

Figure 1 is a perspective view of an automobile tow bar;

Figure 2 is a perspective view of one of the four draft bars comprising the tow bar of Fig. 1;

Fig. 3 is a longitudinal constructional view through the tow bar, showing the tow bar in stressed condition; and Figure 4 is a plan view showing the tow bar in collapsed condition ready for stowing in the luggage compartment of an automobile.

The automobile tow bar illustrated in Fig. 1 of the drawing comprises four draft bars arranged in pairs, 1a, and 2, 2a with the ends of one pair of draft bars 1, 1a overlapping the ends of the companion pair of oppositely extending draft bars 2, 2a. These draft bars are made of mild steel or other tough, springy malleable metal capable of being shaped by drop forging.

The four draft bars are identical in shape and, as best shown in Fig. 2, each comprises a flat bar of rectangular cross-section bent to provide a straight section 3, an inclined section 4, a second straight section 5, extending in a plane parallel to the plane of the straight section 3, and a terminally hooked jaw section 6. The draft bars of each pair of companion draft bars are assembled in oppositely opposed relation so that the jaws 6 are adapted to clamp over the upper and lower edges of a bumper of an automobile, the draft bars 1, 1a being adapted to be connected to the bumper B (indicated in dotted lines) of a pilot car, while the draft bars 2, 2a are adapted to be connected to the bumper $B^1$ (also indicated in dotted lines) of a towed or trailing car.

For spreading the jaws apart to permit attachment of the tow bar to the bumpers of the pilot and trailing automobiles, the straight sections 5 of each pair of draft bars are provided with registering holes 7 through which extends a shackle bolt 8 of slightly less diameter than the holes so that the bolt has a limited amount of lateral play therein. A coil release spring 9 under compression encircles the bolt 8 and exerts a thrust between the inner faces of the pair of companion draft bars which tends to spread the bars apart. Reinforcing caps 10 overlie the outer faces of the jaws for strengthening the jaws and these caps are suitably provided with holes through which the shackle bolt 8 extends, one cap being clamped against the draft bar by the head 8a of the bolt while the other cap is clamped against the companion draft bar by means of a nut 11 screwed upon the opposite end of the bolt 8. A lock nut 12 also screwed upon the projecting end of the bolt 8 bears against nut 11 and prevents the latter from coming loose. Thus, by virtue of the above construction, the jaws will be spread apart by the release spring 9 to allow the jaws to be hooked over the bumper of an automobile when the nuts 11 and 12 are backed off along the shackle bolt 8. Then, by turning the nuts up, the jaws are drawn together, against the action of the release spring 9, to tightly grip the opposite edges of the bumper and positively connect the tow bar to the bumper.

The clamping jaws at both ends of the tow bar are of the same construction and it will be understood that the tow bar is adapted to be connected to the bumpers of the pilot and trailing automobiles in virtually the same manner.

The lapped inner ends of the two pairs of draft bars are provided with registering holes 13, the edges of which are chamfered, as indicated at 13a in Fig. 2. Passing through these holes is a king pin 14 of somewhat smaller diameter than the holes and having at one end a head 14a and its other end being threaded to receive a castellated nut 15 held in place by a cotter pin 16 passing through a transverse aperture in the bolt. The king pin is of appreciable length so as to protect a substantial distance upon opposite sides of the draft bar. Heavy coil springs 17 and 18, under compression, encircle the king pin, the spring 17 exerting a thrust between the outer face of the draft bar 1 and a washer 19 underlying the head 14a of the pin; and the spring 18 exerting a thrust between the outer face of draft bar 1a and a washer 20 abutting the castellated nut 15. A metal ring 21 encircling the pin 14 is interposed between the opposed faces of the draft bars 2 and 2a so as to maintain these bars in slightly spaced relation.

The operation of the tow bar just described is as follows: The jaws of the tow bar being connected to the bumpers of the pilot and trailing automobiles at points substantially midlength of each bumper so that the line of pull extends centrally of the vehicles, the pull of the pilot car being transmitted through the tow bar to the trailing car causing the latter to track behind the pilot car. Whenever a bump is encountered in the road throwing the level of the bumper of one of the cars above or below the level of the bumper of the other car, the draft bars flex to a certain extent to absorb the shock but more importantly the inner ends of the pairs of draft bars at their point of connection with the king pin 14 rock about the end edges of each other, as indicated in Fig. 3, to compress the coil springs 17 and 18, the slightly oversize diameter of the holes 13 in the draft bars with respect to the diameter of the king pin 14 affording sufficient play to allow of such rocking movement. After passing over the bump, the draft bars once again straighten out under the influence of the springs 17 and 18 so that a straight pull is communicated through the king pin from one pair of draft bars to the other.

When the pilot car rounds a curve, either to the right or to the left, the draft bars rotate about the king pin 14 as a pivot causing the trailing car to closely follow the path of the pilot car. Since the tow bar is comparatively short in length and because the single point of pivotal movement, i. e. the king pin 14, is located intermediate the close spacing of the two cars, the tendency of the trailing car to swing out of line with respect to the pilot car when the cars are rounding a turn is reduced to a minimum. Thus, the trailing car can be depended upon to faithfully track behind the pilot car under all possible road conditions.

When not in use, the tow bar may be collapsed for convenient stowage in the luggage compartment or tool box of an automobile by folding the pairs of draft bars together scissors-fashion about the king pin 14 into the compact condition shown in Fig. 4.

While I have described my tow bar as applied to the towing of automobiles, obviously it may be used in connection with other types of vehicles, such as trailers, tractors, wagons, industrial trucks, etc.

It will be apparent to those skilled in the art that various changes in construction and design may be made in the preferred form of my tow bar as described above without departing from the spirit of my invention as defined by the following claims.

I claim:

1. A tow bar for vehicles comprising a plurality of draft bars with the inner end of one draft bar overlapping the inner end of another draft bar, a king pin extending through registering holes in the overlapped ends of the draft bars and providing a pivotal connection between said draft bars, said pin being of smaller diameter than said holes and projecting a substantial distance beyond opposite sides of the draft bars, compression springs associated with said pin and exerting pressure upon opposite sides of the draft bars for urging said draft bars together, and clamping jaws upon the outer ends of said draft bars.

2. A tow bar for vehicles comprising a plurality of draft bars arranged in paired relation with the inner ends of one pair of draft bars overlapping the inner ends of another pair of draft bars, a king pin extending through registering holes in the overlapped ends of the draft bars and providing a pivotal connection between the pairs of draft bars, said pin being of smaller diameter than said holes and projecting a substantial distance beyond opposite sides of the draft bars, compression springs associated with said pin and exerting pressure upon opposite sides of the draft bars for urging said draft bars together, and clamping jaws upon the outer end of each pair of draft bars.

3. A tow bar for vehicles comprising a plurality of draft bars arranged in paired relation with the inner ends of one pair of draft bars overlapping the inner ends of another pair of draft bars and the outer ends of each pair of draft bars being disposed in overlying relation, a king pin extending through registering holes in the overlapped ends of the draft bars, said pin being of smaller diameter than said holes and projecting a substantial distance beyond opposite sides of the draft bars, coil compression springs encircling the pin and exerting pressure upon opposite sides of the draft bars for urging the draft bars together, cooperating jaws upon the outer ends of each pair of draft bars, release springs for urging said clamping jaws to open position and means for drawing said jaws together in opposition to said release springs.

4. A tow bar for vehicles comprising a plurality of draft bars arranged in paired relation with the inner ends of one pair of draft bars flatly overlapping the inner ends of another pair of draft bars and the outer ends of each pair of draft bars being disposed in overlying spaced relation, a king pin extending through registering holes in the overlapped ends of the draft bars, said pin being of smaller diameter than said holes and projecting a substantial distance beyond opposite sides of the draft bars, coil compression springs encircling the pin and exerting pressure upon opposite sides of the draft bars for urging the draft bars together, cooperating clamping jaws upon the outer ends of each pair of draft bars, a shackle bolt extending through registering openings in each pair of draft bars adjacent their outer ends, coil release springs encircling said shackle bolts and urging said jaws to open position and nuts on said shackle bolts for drawing said jaws together in opposition to said release springs.

5. A tow bar for vehicles comprising a plurality of draft bars of spring metal and of substantially the same shape each comprising two straight sections connected by an inclined section and having a hooked section located at an end of one of said straight sections defining a clamping jaw, said draft bars being arranged in paired relation with the inner straight sections of one pair of draft bars overlapping the inner straight section of another pair of draft bars, the draft bars of each pair of draft bars being disposed in reverse opposed relation with the jaw of one draft bar opposite the jaw of the other draft bar, a king pin extending through registering holes in the overlapped ends of the draft bars, said pin being of smaller diameter than said holes and projecting a substantial distance beyond opposite sides of the draft bars, coil compression springs encircling the pin and exerting pressure upon opposite sides of the draft bars for urging the draft bars together, a shackle bolt extending through registering openings in each pair of draft bars adjacent their outer ends, coil release springs encircling said shackle bolts and urging said bolts to open position and nuts on said shackle bolts for drawing said jaws together in opposition to said release springs.

GEORGE E. HILL.

REFERENCES CITED

The following references are of record in the file of this patent:

UNITED STATES PATENTS

| Number | Name | Date |
|---|---|---|
| 2,150,999 | Wight | Mar. 21, 1939 |